United States Patent
Townsend, Jr.

(10) Patent No.: US 11,595,074 B2
(45) Date of Patent: Feb. 28, 2023

(54) REFLECTIVE COVERING ASSEMBLY

(71) Applicant: Thomas M. Townsend, Jr., Corpus Christi, TX (US)

(72) Inventor: Thomas M. Townsend, Jr., Corpus Christi, TX (US)

(*) Notice: Subject to any disclaimer, the term of this patent is extended or adjusted under 35 U.S.C. 154(b) by 51 days.

(21) Appl. No.: 17/344,132

(22) Filed: Jun. 10, 2021

(65) Prior Publication Data
US 2022/0399914 A1 Dec. 15, 2022

(51) Int. Cl.
*H04B 1/3888* (2015.01)

(52) U.S. Cl.
CPC .................. *H04B 1/3888* (2013.01)

(58) Field of Classification Search
CPC .................................................. H04B 1/3888
See application file for complete search history.

(56) References Cited

U.S. PATENT DOCUMENTS

| | | | |
|---|---|---|---|
| 9,294,601 B2 | 3/2016 | Hammond | |
| 9,407,743 B1* | 8/2016 | Hirshberg | H04B 1/385 |
| 9,615,005 B1* | 4/2017 | Wunderli | H04N 5/2252 |
| 2006/0052063 A1 | 3/2006 | Lohr | |
| 2012/0052929 A1 | 3/2012 | Thammasouk | |
| 2015/0050965 A1 | 2/2015 | Perry | |
| 2017/0134065 A1* | 5/2017 | Cramer | F21V 29/70 |
| 2017/0194997 A1* | 7/2017 | Tu | H04B 1/3888 |

* cited by examiner

*Primary Examiner* — Yuwen Pan
*Assistant Examiner* — Fatuma G Sherif

(57) ABSTRACT

A reflective covering assembly enabling recovery of an electronic device includes a plurality of reflectors engaged to a shell, which is shaped complementarily to an electronic device, such as a smart phone. The shell has an open face through which the electronic device can be inserted into the shell so that the shell is removably engaged to the electronic device. The shell protects the electronic device from damage. The reflectors reflect light so that the shell is visible in low ambient light conditions, facilitating recovery of the electronic device when it is misplaced.

12 Claims, 6 Drawing Sheets

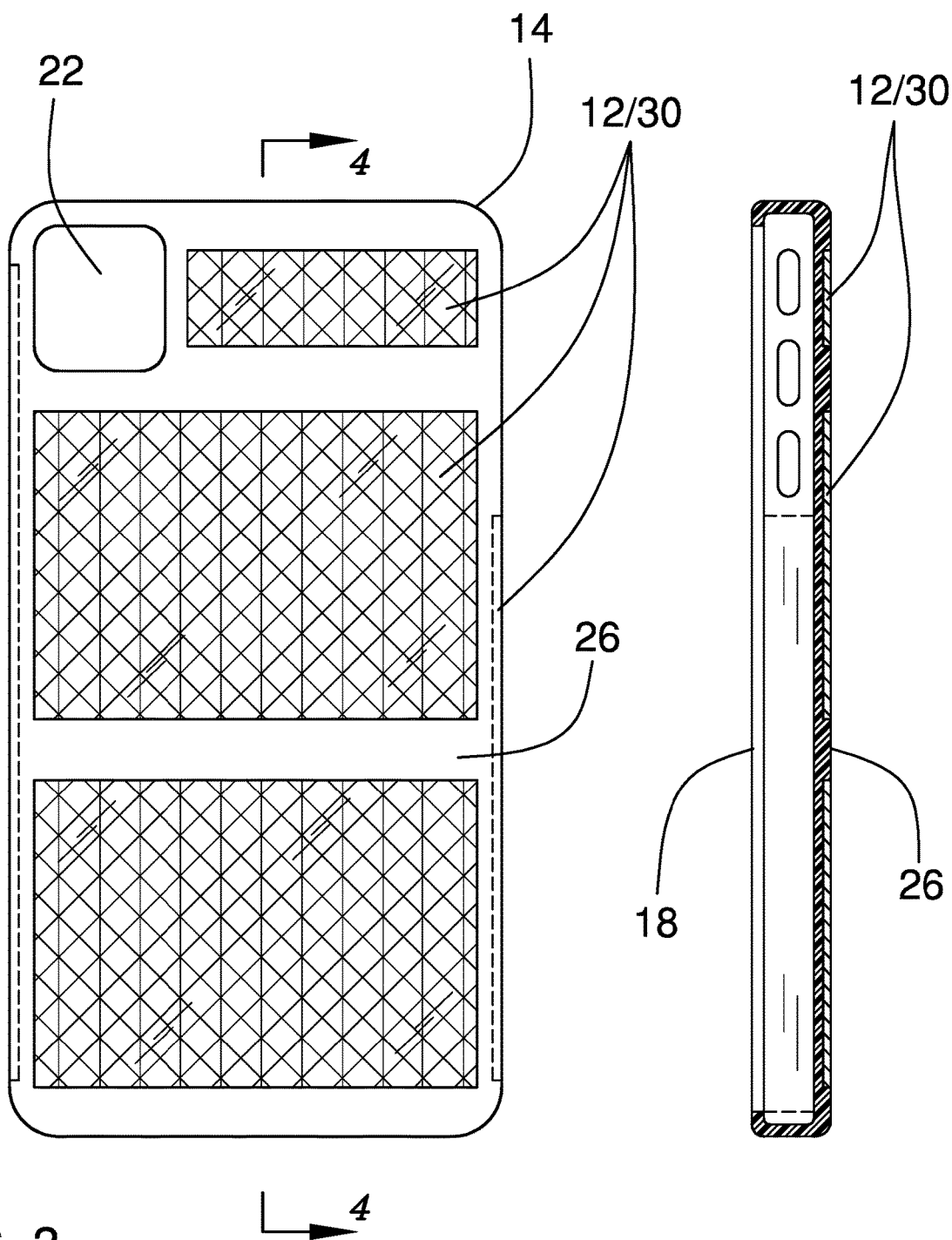

REFLECTIVE COVERING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to covering assemblies and more particularly pertains to a new covering assembly enabling recovery of an electronic device. The present invention discloses a covering assembly for an electronic device incorporating a plurality of reflectors.

(2) Description of Related Art Including Information Disclosed Under 37 CFR 1.97 and 1.98

The prior art relates to covering assemblies. Prior art covering assemblies may incorporate fluorescent materials, lights, and the like. The function of these prior art covering assemblies in not to facilitate finding of an electronic device to which they are attached. What is lacking in the prior art is a covering assembly for an electronic device incorporating a plurality of reflectors.

BRIEF SUMMARY OF THE INVENTION

An embodiment of the disclosure meets the needs presented above by generally comprising a plurality of reflectors engaged to a shell, which is shaped complementarily to an electronic device, such as a smart phone. The shell has an open face, which is configured for selective insertion of the electronic device into the shell so that the shell is removably engaged to the electronic device. The shell is configured to protect the electronic device from damage. The reflectors are configured to reflect light so that the shell is visible in low ambient light conditions, facilitating recovery of the electronic device when it is misplaced.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a rear view of an embodiment of the disclosure.

FIG. 4 is a cross-sectional view of an embodiment of the disclosure.

DETAILED DESCRIPTION OF THE INVENTION

Figure 1:
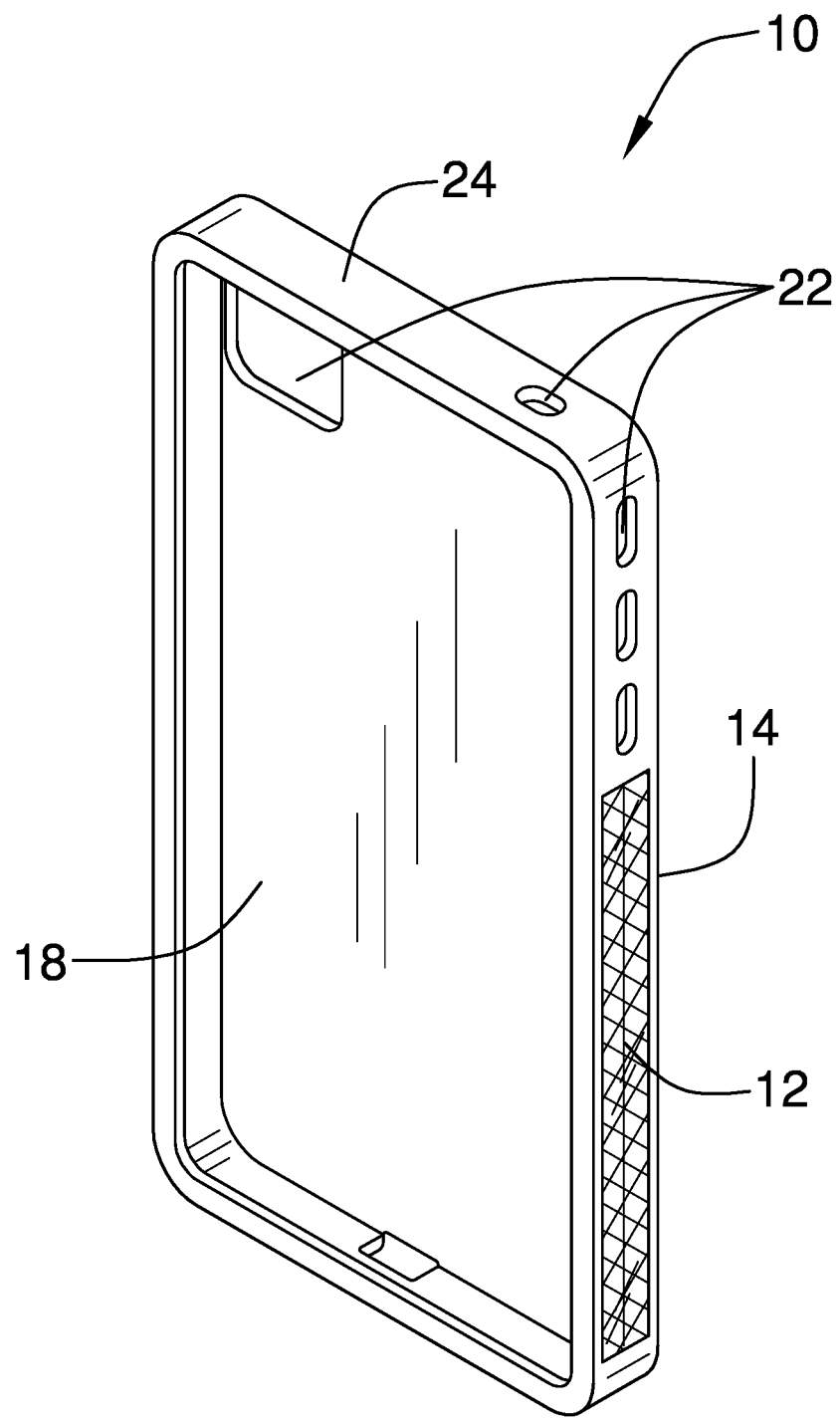
FIG. 1 is a front isometric perspective view of a reflective covering assembly according to an embodiment of the disclosure.
Figure 2:
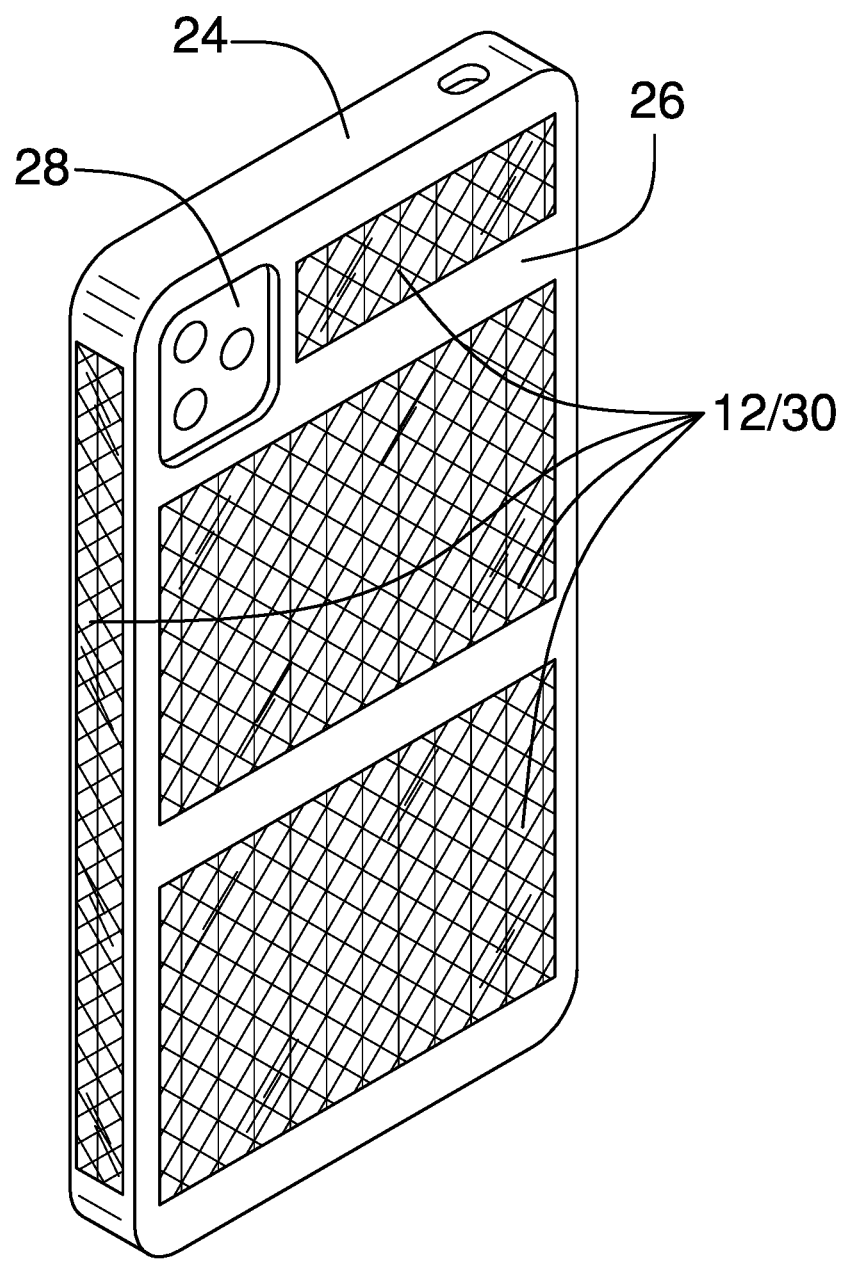
FIG. 2 is a rear isometric perspective view of an embodiment of the disclosure.
Figure 5:
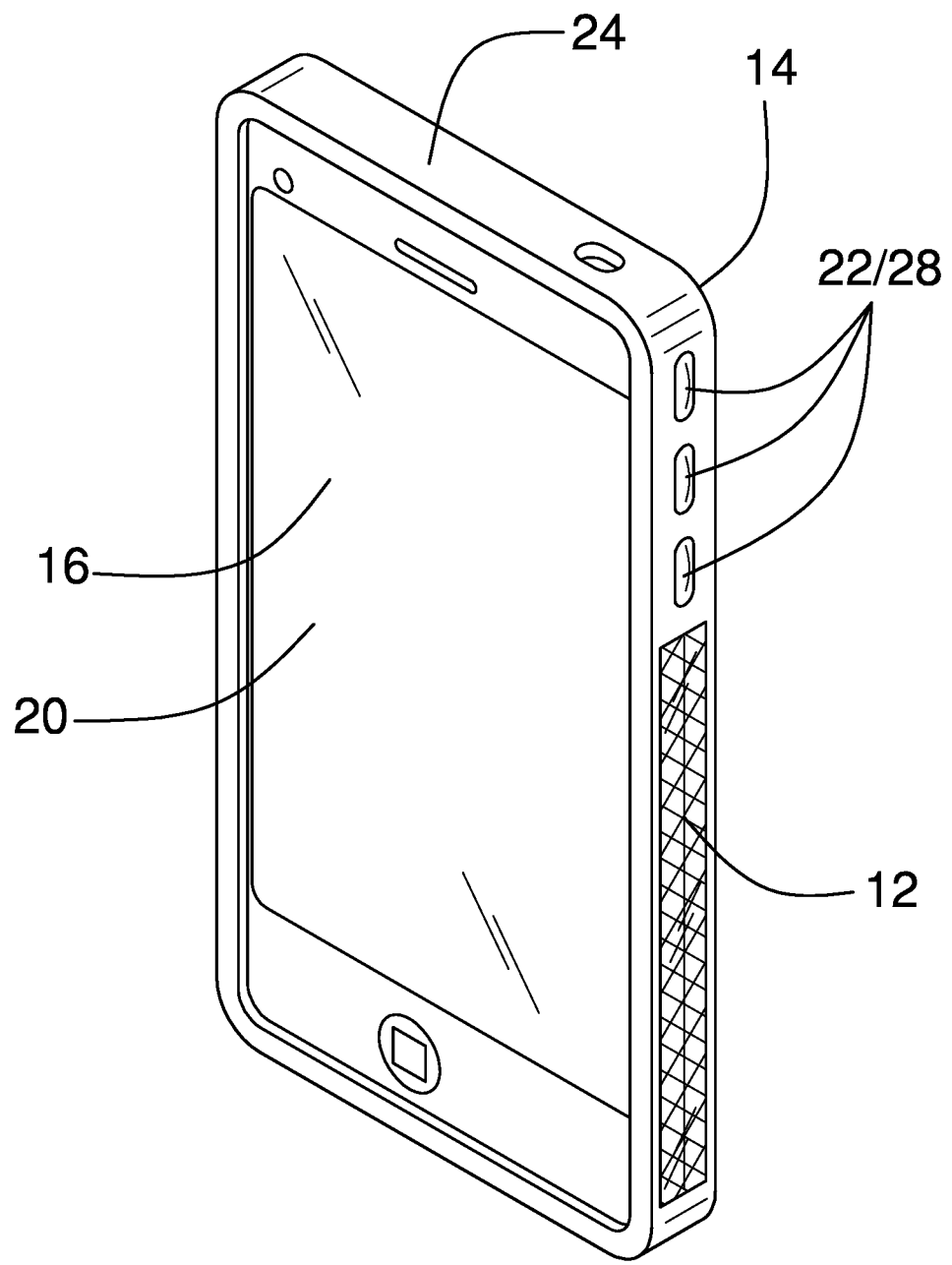
FIG. 5 is an in-use view of an embodiment of the disclosure.
Figure 6:
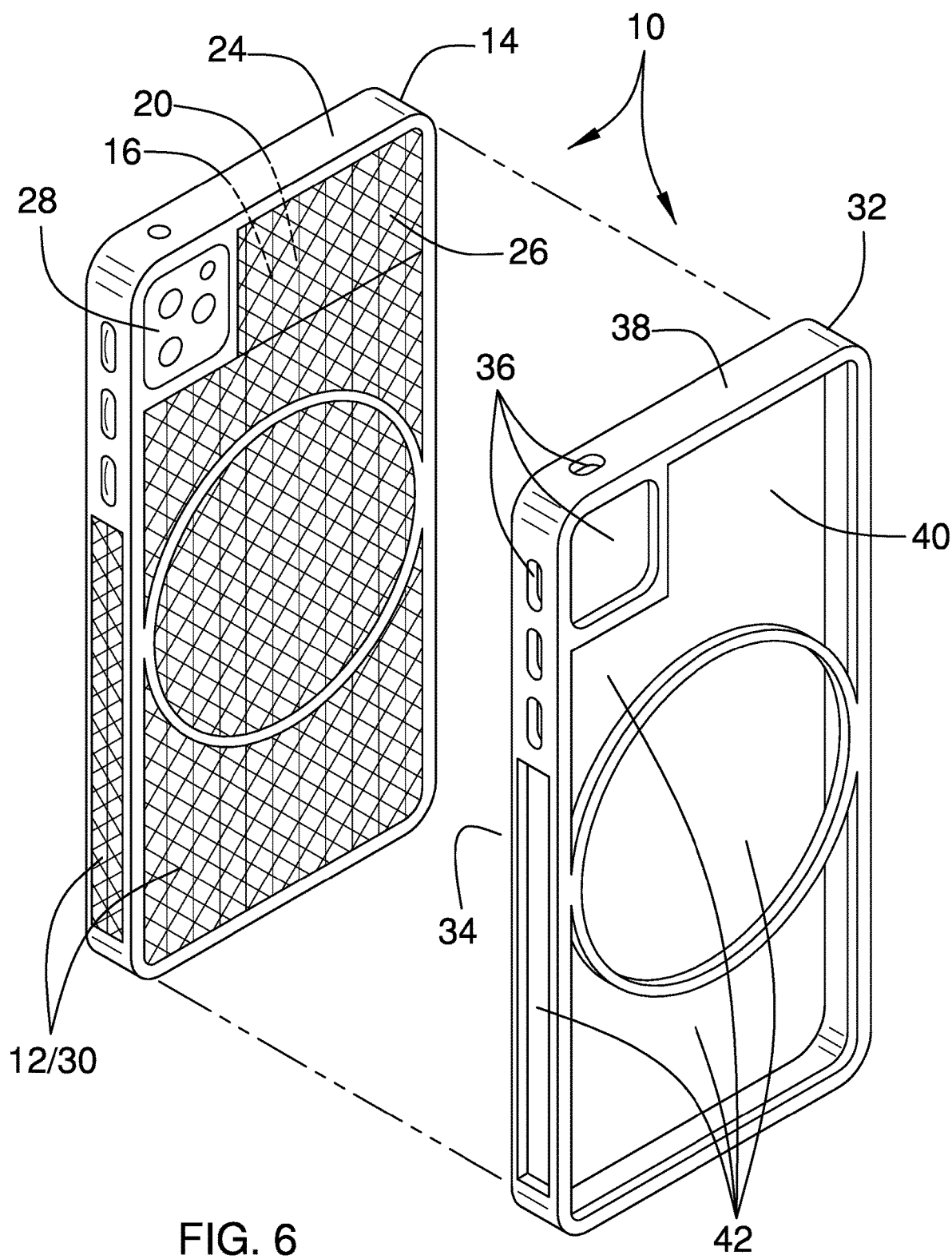
FIG. 6 is an exploded view of an embodiment of the disclosure.
Figure 7:
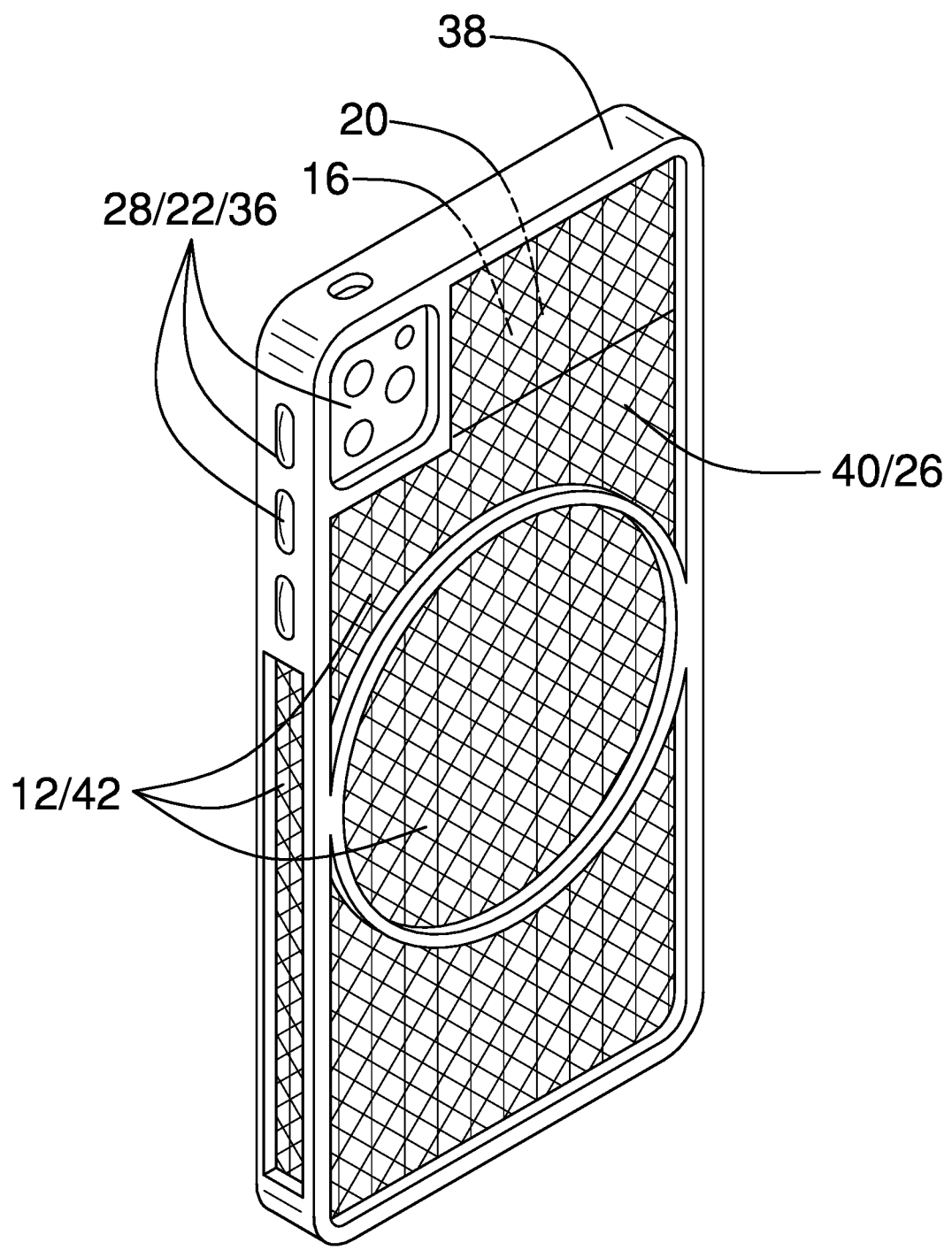
FIG. 7 is an isometric perspective view of an embodiment of the disclosure.

With reference now to the drawings, and in particular to FIGS. 1 through 7 thereof, a new covering assembly embodying the principles and concepts of an embodiment of the disclosure and generally designated by the reference numeral 10 will be described.

As best illustrated in FIGS. 1 through 7, the reflective covering assembly 10 generally comprises a plurality of reflectors 12, which is engaged to a shell 14. The shell 14 is shaped complementarily to an electronic device 16. The shell 14 has an open face 18, which is configured for selective insertion of the electronic device 16 into the shell 14 so that the shell 14 is removably engaged to the electronic device 16. The shell 14 may be configured for insertion of a smart phone 20, or other type of electronic device 16, such as a tablet computer, global positioning unit, and the like. The shell 14 is configured to protect the electronic device 16 from damage.

A plurality of openings 22 is positioned in a sidewall 24 and a closed face 26 of the shell 14. Each opening 22 is substantially alignable with an associated operational element 28 of the electronic device 16 when the electronic device 16 is inserted into the shell 14.

The reflectors 12 are configured to reflect light so that the shell 14 is visible in low ambient light conditions, facilitating recovery of the electronic device 16 when it is misplaced. The plurality of reflectors 12 may be configured as a plurality of strips 30, with each strip 30 being molded into a respective one of the sidewall 24 and the closed face 26 of the shell 14. The present invention also anticipates the plurality of strips 30 substantially covering the sidewall 24 and the closed face 26 of the shell 14.

The shell 14 may comprise rubber, silicone, or flexible elastomer so that the shell 14 is resiliently flexible, as shown in FIGS. 1-5. The shell 14 also may comprise one or both of rigid elastomer and metal so that the shell 14 is resistant to deformation.

With the shell 14 comprising one or both of rigid elastomer and metal, the reflective covering assembly 10 also comprises a case 32, which is shaped complementarily to the shell 14. The case 32 comprises rubber, silicone, or flexible elastomer so that the case 32 is resiliently flexible. The case 32 has an open facet 34, which is configured for selective insertion of the shell 14 containing the electronic device 16 into the case 32 so that the case 32 is removably engaged to the shell 14 containing the electronic device 16.

A plurality of orifices 36 is positioned in a perimeter wall 38 and a closed facet 40 of the case 32. Each orifice 36 is substantially alignable with an associated opening 22 in the shell 14 so that the operational elements 28 of the electronic device 16 remain exposed. The case 32 is positioned to protect the electronic device 16 from damage. A plurality of cutouts is positioned in the perimeter wall 38 and the closed facet 40 of the case 32. Each cutout is aligned with a respective reflector so that the reflector 12 is positioned to reflect light.

In use, the electronic device 16 is inserted through the open face 18 into the shell 14 so that the shell 14 is removably engaged to the electronic device 16 and is positioned to protect the electronic device 16 from damage. The reflectors 12 reflect light so that the shell 14 is visible in low ambient light conditions, facilitating recovery of the electronic device 16 should it is misplaced.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A reflective covering assembly comprising:
a shell shaped complementarily to an electronic device, the shell having an open face, wherein the open face is configured for selective insertion of the electronic device into the shell, such that the shell is removably engaged to the electronic device, wherein the shell is configured for protecting the electronic device from damage;
a plurality of reflectors engaged to the shell, wherein the reflectors are configured for reflecting light, such that the shell is visible in low ambient light conditions, facilitating recovery of the electronic device when it is misplaced:
the shell comprising one or both of rigid elastomer and metal, such that the shell is resistant to deformation;
a plurality of openings positioned in a sidewall and a closed face of the shell, each opening being substantially alignable with an associated operational element of the electronic device when the electronic device is inserted into the shell;
a case shaped complementarily to the shell, the case having an open facet, the case comprising rubber, silicone, or flexible elastomer, such that the case is resiliently flexible, wherein the open facet is configured for selective insertion of the shell containing the electronic device into the case, such that the case is removably engaged to the shell containing the electronic device, such that the case is positioned for protecting the electronic device from damage;
a plurality of orifices positioned in a perimeter wall and a closed facet of the case, each orifice being substantially alignable with an associated opening in the shell; and
a plurality of cutouts positioned in the perimeter wall and the closed facet of the case, each cutout is being substantially alignable with a respective reflector so that the reflector is positioned to reflect light.

2. The reflective covering assembly claim 1, wherein the shell is configured for insertion of a smart phone.

3. The reflective covering assembly claim 1, wherein the plurality of reflectors is configured as a plurality of strips, each strip being molded into a respective one of a sidewall and a closed face of the shell.

4. The reflective covering assembly claim 1, further including a plurality of openings positioned in a sidewall and a closed face of the shell, each opening being substantially alignable with an associated operational element of the electronic device when the electronic device is inserted into the shell.

5. The reflective covering assembly claim 1, wherein the shell comprises rubber, silicone, or flexible elastomer, such that the shell is resiliently flexible.

6. A reflective covering system comprising:
an electronic device:
a shell shaped complementarily to the electronic device, the shell having an open face, such that the open face is positioned for selective insertion of the electronic device into the shell, such that the shell is removably engaged to the electronic device, such that the shell is positioned for protecting the electronic device from damage;
a plurality of reflectors engaged to the shell, wherein the reflectors are configured for reflecting light, such that the shell is visible in low ambient light conditions, facilitating recovery of the electronic device when it is misplaced;
the shell comprising one or both of rigid elastomer and metal, such that the shell is resistant to deformation:
a plurality of openings positioned in a sidewall and a closed face of the shell, each opening being substantially alignable with an associated operational element of the electronic device when the electronic device is inserted into the shell;
a case shaped complementarily to the shell the case having an open facet, the case comprising rubber, silicone, or flexible elastomer, such that the case is resiliently flexible, wherein the open facet is configured for selective insertion of the shell containing the electronic device into the case, such that the case is removably engaged to the shell containing the electronic device, such that the case is positioned for protecting the electronic device from damage;

a plurality of orifices positioned in a perimeter wall and a closed facet of the case, each orifice being substantially alignable with an associated opening in the shell; and a plurality of cutouts positioned in the perimeter wall and the closed facet of the case, each cutout is being substantially alignable with a respective reflector so that the reflector is positioned to reflect light.

7. The reflective covering system 6, wherein the shell is configured for insertion of a smart phone.

8. The reflective covering system 6, wherein the plurality of reflectors is configured as a plurality of strips, each strip being molded into a respective one of a sidewall and a closed face of the shell.

9. The reflective covering system 6, further including a plurality of openings positioned in a sidewall and a closed face of the shell, each opening being substantially alignable with an associated operational element of the electronic device when the electronic device is inserted into the shell.

10. The reflective covering system 6, wherein the shell comprises rubber, silicone, or flexible elastomer, such that the shell is resiliently flexible.

11. A reflective covering assembly comprising:

a shell shaped complementarily to an electronic device, the shell having an open face, wherein the open face is configured for selective insertion of the electronic device into the shell, such that the shell is removably engaged to the electronic device, wherein the shell is configured for protecting the electronic device from damage, the shell being configured for insertion of a smart phone;

a plurality of reflectors engaged to the shell, wherein the reflectors are configured for reflecting light, such that the shell is visible in low ambient light conditions, facilitating recovery of the electronic device when it is misplaced; the plurality of reflectors being configured as a plurality of strips, each strip being molded into a respective one of a sidewall and a closed face of the shell;

a plurality of openings positioned in a sidewall and the closed face of the shell, each opening being substantially alignable with an associated operational element of the electronic device when the electronic device is inserted into the shell;

the shell comprising one or both of rigid elastomer and metal, such that the shell is resistant to deformation;

a case shaped complementarily to the shell, the case having an open facet, the case comprising rubber, silicone, or flexible elastomer, such that the case is resiliently flexible, wherein the open facet is configured for selective insertion of the shell containing the electronic device into the case, such that the case is removably engaged to the shell containing the electronic device, such that the case is positioned for protecting the electronic device from damage, the case being substantially transparent, such that the reflectors are positioned for reflecting light;

a plurality of orifices positioned in a perimeter wall and a closed facet of the case, each orifice being substantially alignable with an associated opening in the shell; and a plurality of cutouts positioned in the perimeter wall and the closed facet of the case, each cutout is being substantially alignable with a respective reflector so that the reflector is positioned to reflect light.

12. The reflective covering assembly claim 11, wherein the shell comprises rubber, silicone, or flexible elastomer, such that the shell is resiliently flexible.

\* \* \* \* \*